US010859958B1

(12) United States Patent
Ii

(10) Patent No.: US 10,859,958 B1
(45) Date of Patent: Dec. 8, 2020

(54) IMAGE FORMING APPARATUS THAT TRANSFERS DATA FROM VOLATILE CACHE MEMORY TO NON-VOLATILE STORAGE BASED ON POWER SUPPLY STATE AND CONTROL METHOD THEREOF

(71) Applicant: TOSHIBA TEC KABUSHIKI KAISHA, Tokyo (JP)

(72) Inventor: Motoki Ii, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/568,915

(22) Filed: Sep. 12, 2019

(51) Int. Cl.
*G06F 15/00* (2006.01)
*G06K 1/00* (2006.01)
*G06K 15/00* (2006.01)
*G03G 15/00* (2006.01)
*B41J 29/393* (2006.01)

(52) U.S. Cl.
CPC ........ *G03G 15/5004* (2013.01); *B41J 29/393* (2013.01); *G03G 15/80* (2013.01)

(58) Field of Classification Search
CPC .... G03G 15/5004; G03G 15/80; B41J 29/393
USPC ........................................ 358/1.14, 1.15, 1.1
See application file for complete search history.

(56) References Cited

U.S. PATENT DOCUMENTS

2008/0162780 A1* 7/2008 Kohinata ................ G06F 21/62 711/100
2009/0235102 A1* 9/2009 Koshika ............. G03G 15/5004 713/324
2010/0262853 A1* 10/2010 Goda ...................... G06F 9/461 713/323

FOREIGN PATENT DOCUMENTS

JP 2016-112850 A 6/2016

* cited by examiner

*Primary Examiner* — Douglas Q Tran
(74) *Attorney, Agent, or Firm* — Kim & Stewart LLP

(57) ABSTRACT

An image forming apparatus includes a printer, a controller configured to transmit a control signal to the printer to control the printer, a storage device including a volatile cache memory region and a non-volatile storage region, and a power control circuit. The power control circuit is configured to supply power from an external power source thereto to the printer and the controller, and supply auxiliary power stored therein when the power from the external power source is cut off. The controller includes a processor configured to, in case that the power from the external power source is cut off, instruct the storage device to transfer data from the volatile cache memory region to the non-volatile storage region, and then cause power supplied to the processor to be cut off.

20 Claims, 5 Drawing Sheets

IMAGE FORMING APPARATUS THAT TRANSFERS DATA FROM VOLATILE CACHE MEMORY TO NON-VOLATILE STORAGE BASED ON POWER SUPPLY STATE AND CONTROL METHOD THEREOF

FIELD

Embodiments described herein relate generally to an image forming apparatus and a control method thereof.

BACKGROUND

An image forming apparatus of the related art executes data corruption prevention processing using power stored in a power supply unit if a power failure (e.g., power outage) occurs. The processing to prevent data corruption includes stopping access to each memory, stopping a power supply to a drive device, and the like. Generally, storage devices, such as an HDD or an SSD, used in the image forming apparatus have a cache memory, and data stored in the cache memory is written into a non-volatile storage area. When a power failure occurs, the storage device executes a cache flush operation which stores the data of the cache memory into the non-volatile storage area.

In recent years, HDD and SSD devices have increased the capacity of the cache memory. Thus, the time required for a cache flush operation tends to become longer as well. However, the amount of power stored in the power supply unit in the image forming apparatus is generally not very large. Therefore, a storage device with a large capacity cache may not be able to complete cache flush operations with the power which can be supplied by the power supply unit after the power failure occurs.

DETAILED DESCRIPTION

In general, according to an embodiment, an image forming apparatus includes a printer, a controller configured to transmit a control signal to the printer to control the printer, a storage device including a volatile cache memory region and a non-volatile storage region, and a power control circuit. The power control circuit is configured to supply power from an external power source thereto to the printer and the controller, and supply auxiliary power stored therein when the power from the external power source is cut off. The controller includes a processor configured to instruct the storage device to transfer data from the volatile cache memory region to the non-volatile storage region if the power from the external power source is cut off, and then cause power supplied to the processor to be cut off.

Hereinafter, example embodiments will be described with reference to the accompanying drawings.

Figure 1:
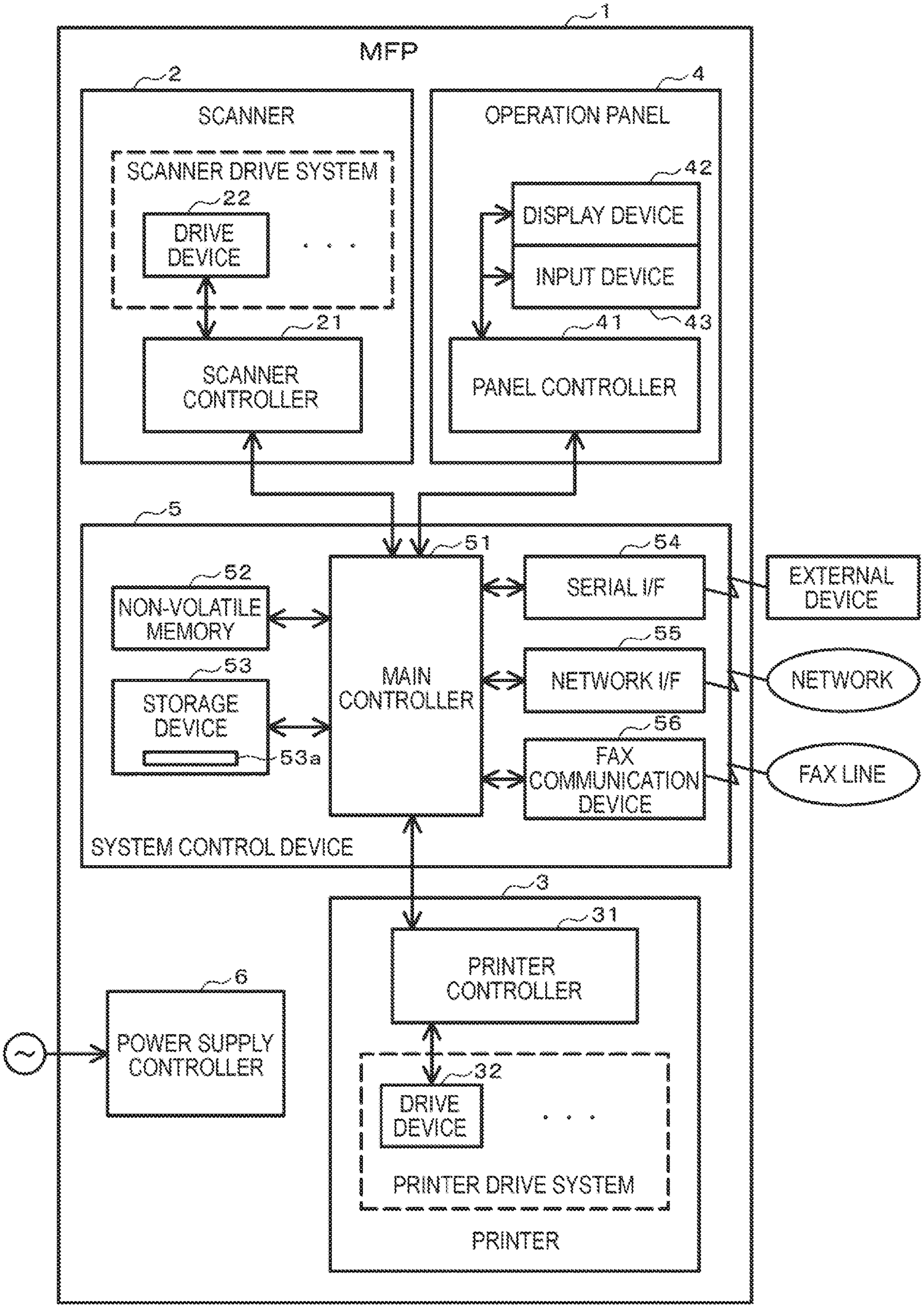
FIG. 1 is a block diagram schematically illustrating a multi-functional peripheral according to an embodiment.

FIG. 1 is a diagram schematically illustrating a configuration example of a multi-functional peripheral as an image reading apparatus and an image forming apparatus according to an embodiment.

A multi-functional peripheral (MFP) 1 according to the embodiment includes a scanner 2, a printer 3, an operation panel 4, a system control device 5, and a power supply controller 6. The MFP 1 includes a main body containing one or more of the above-presented components of the MFP 1. For example, the MFP 1 performs copy processing by cooperating with the scanner 2 and the printer 3.

First, a configuration example of the scanner 2 will be described.

The scanner 2 is an image reading apparatus that reads an image of an original document and then converts the read image thereof into image data. For example, the scanner 2 is provided on an upper part of the main body of the MFP 1. The scanner 2 includes a scanner controller 21 and a drive system (a scanner drive system) including various drive devices 22.

The scanner controller 21 controls the entire scanner 2. The scanner controller 21 controls each drive device 22 according to an instruction from the system control device 5. Further, the scanner controller 21 supplies driving power supplied from the power supply controller 6 to one or more components of the scanner 2.

The drive device 22 includes, for example, a motor, an illumination element, a photoelectric conversion element, and the like. The motor of the drive device 22 is a power source for moving a carriage mounted with an optical system for scanning an original document surface. The illumination element is an exposure lamp, and the like. The illumination element emits light for reading the original document. The photoelectric conversion element is formed of a CCD sensor, or the like. The photoelectric conversion element converts light reflected from the original document surface into image data. The scanner controller 21 reads an image on the original document surface by operating the components of the drive device 22.

Next, a configuration example of the printer 3 will be described.

The printer 3 forms an image on a sheet as a recording medium. The printer 3 includes a printer controller 31 and a printer drive system including various drive devices 32.

The printer controller 31 controls the entire printer 3. The printer controller 31 executes print processing by controlling each drive device 32 according to an instruction from the system control device 5. Further, the printer controller 31 supplies the driving power supplied from the power supply controller 6 to one or more components in the printer 3.

The printer 3 includes various drive devices 32 corresponding to an image forming system. For example, when the printer 3 is an electrophotographic system, the drive device 32 includes a motor, a solenoid, a clutch, an exposure device, a fixing device, and the like. The motor of the drive device 32 is a power source for driving various rollers, and is driven by the power whose supply is controlled by the printer controller 31.

Further, the image forming apparatus to which the embodiment can be applied is not limited to a printer of the electrophotographic type. For example, the image forming apparatus may be a printer of an inkjet type or a thermal transfer type.

Next, a configuration example of the operation panel 4 will be described.

The operation panel 4 is a user interface. The operation panel 4 provides information to a user and an operation instruction can be input by a user. For example, the operation panel 4 is provided at the upper part of the main body of the MFP 1. The operation panel 4 is connected to the system control device 5. The operation panel 4 includes a panel controller 41, a display device 42, an input device 43, and the like.

The panel controller 41 controls the entire operation panel 4. The panel controller 41 controls the display device 42 and the input device 43 according to the instruction from the system control device 5. Further, the panel controller 41 supplies the driving power supplied from the power supply controller 6 to the display device 42 and the input device 43.

The display device 42 displays information. The input device 43 detects user operations such as the operation instruction input by the user, and the like. The display device 42 and the input device 43 are formed of, for example, a display device including a touch panel function. The panel controller 41 outputs the information input by the input device 43 to a main controller 51.

Next, a configuration example of the system control device 5 will be described.

The system control device 5 controls the entire MFP 1. Further, the system control device 5 also functions as a processing unit that executes processing such as data processing, various data communication, and the like.

In the configuration example illustrated in FIG. 1, the system control device 5 includes the main controller 51, a non-volatile memory 52, a storage device 53, a serial I/F 54, a network I/F 55, and a FAX communication device 56.

The main controller 51 includes a processor, a RAM (Random Access Memory), a ROM (Read Only Memory), various interfaces, and the like. The main controller 51 executes various kinds of processing according to a program. The main controller 51 is connected to each controller of the scanner 2, the printer 3, and the operation panel 4 via the interface. The main controller 51 outputs the operation instruction to one or more components of the system control device 5 and acquires various kinds of information from one or more components of the system control device 5. The main controller 51 controls the one or more components, thereby totally controlling the entire MFP 1. Further, the main controller 51 is also connected to the power supply controller 6. The main controller 51 supplies the driving power supplied from the power supply controller 6 to one or more components of the system control device 5.

The non-volatile memory 52 is a rewritable non-volatile memory. For example, the non-volatile memory 52 is an EEPROM, a flash ROM, and the like. The non-volatile memory 52 stores, for example, data such as a setting value, a program, and the like.

The storage device 53 stores control data, a control program, setting information, and the like. The storage device 53 includes a rewritable non-volatile storage region. The storage device 53 is, for example, a hard disk drive (HDD), a solid state drive (SSD), and the like. The storage device 53 includes a cache memory 53*a* for temporarily holding data. The storage device 53 writes the data stored in the cache memory 53*a* into the non-volatile storage region of the storage device 53. The storage device 53 has a function of continuing to perform a cache flush operation of writing the data stored in the cache memory 53*a* into the non-volatile storage region even though access (e.g., write data into the storage device 53 or read data out of the storage device 53) from the controller is stopped.

The serial interface 54 is an interface for being locally connected to an external device. For example, the serial interface 54 is a universal serial bus (USB), and the like.

The network I/F 55 is an interface for performing network communication. The network I/F 55 communicates with the external device via a network.

The FAX communication device 56 is an interface for performing facsimile communication. The FAX communication device 56 is connected to a line for FAX communication. The FAX communication device 56 functions as a FAX for faxing image data supplied from the main controller 51 or for receiving FAX data.

Further, as illustrated in FIG. 1, the MFP 1 includes the power supply controller 6 for supplying power from an external power source to one or more components of the MFP 1.

The power supply controller 6 is connected to an external power supply such as a commercial AC (Alternating Current) power supply, and the like. The power supply controller 6 supplies input power from the external power supply to the one or more components as driving power. For example, the power supply controller 6 converts AC power input from the commercial AC power supply into DC (Direct Current) power, and then supplies the converted DC power to the one or more components. The power supply controller 6 has a configuration of temporarily holding (stores) the power. Therefore, the power supply controller 6 supplies the stored power into the MFP 1 even when the power supply from the external power supply is cutoff (e.g., when a power failure occurs). However, the power supply controller 6 does not include a power storage device such as a secondary battery and is not capable of supplying the power by which the MFP 1 can be normally operated when the power failure occurs.

Next, a configuration for controlling the power from the power supply in the MFP 1 configured as described above will be described.

As described above, in the MFP 1, the power supply controller 6 temporarily stores power. When the power supplied from the external power supply is cut off (during the power failure), the system control device 5 executes data corruption prevention processing by using the power stored in the power supply controller 6. The data corruption prevention processing to be executed at the time of power failure is processing of executing an access stop to the non-volatile memory and the storage device and of executing a stop of the power supply to the drive device such as a motor, and the like. An object of the access stop is to protect the data in the non-volatile memory and the storage device. The stop of the power supply to the drive device is processing carried out for extending the time during which the power supply to the system control device 5 is maintained.

The storage device 53 such as the HDD or the SSD, and the like includes the cache memory 53*a*. The storage device 53 temporarily stores data in the cache memory 53*a* as data writing processing, and stores the data stored in the cache memory 53*a* in the storage area. The storage device 53 continues to execute the cache flush operation of storing the data stored in the cache memory 53*a* in the storage area even when the access stop thereto is being executed due to the power failure, and the like. That is, the storage device 53 continuously executes the cache flush operation as long as the operable power is supplied even after an access stop signal is received.

Therefore, in order to protect the data of the cache memory 53*a* when the power failure occurs, it is desirable to complete the cache flush operation by the power supplied from the power supply controller 6 after the power failure occurs. In other words, the MFP 1 need to provide power for at least the required cache flush time necessary for performing the operation of storing the data in the cache memory 53*a* when a power failure occurs.

The required cache flush time corresponds to the amount of the data stored in the cache memory 53*a*. When the cache memory is large in capacity, the cache flush time becomes long. In the storage device such as the HDD or the SSD, and the like, the cache memory is also typically increased in capacity as the storage area of the device is increased in capacity. The MFP 1 according to the embodiment secures the cache flush time by extending the power holding time for holding the power supply to the storage device 53 after the power failure occurs.

Hereinafter, a first configuration example and a second configuration example of a power supply system in the MFP 1 according to the embodiment will be described.

First, the first configuration example of the power supply system in the MFP 1 will be described.

Figure 2:
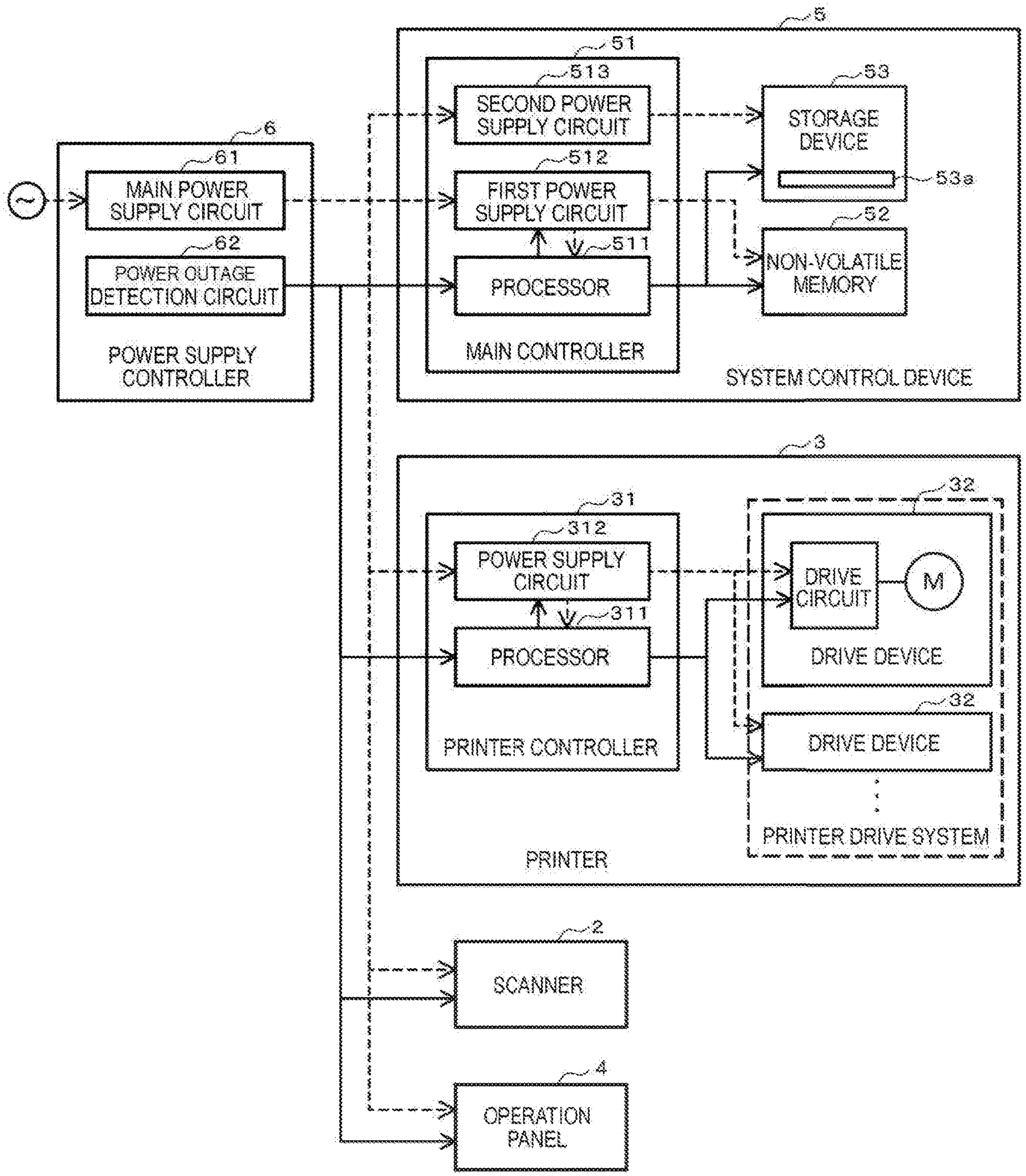
FIG. 2 is a block diagram illustrating a first configuration example of a power supply system.

FIG. 2 is a block diagram illustrating the first configuration example of the power supply system in the MFP 1.

The power supply controller 6 includes a main power supply circuit 61 and a power failure detection circuit 62.

The main power supply circuit 61 is a circuit that temporarily stores the power from the external power supply and supplies the stored power to one or more components of the MFP 1 as the driving power. For example, the main power supply circuit 61 includes an AC/DC converter circuit that converts AC power as the external power supply into DC driving power. The main power supply circuit 61 continues to supply power even after the power supply from the external power supply stops by using power previously stored from the external power supply. However, the main power supply circuit 61 does not provide the large amount of power that would be required for continuing the normal operation of the MFP 1, but rather has a circuit configuration such that the supply of the driving power can only be briefly be continued.

The power failure detection circuit 62 detects that the power supply from the external power supply is stopped, and outputs a power failure notification signal. For example, the power failure detection circuit 62 monitors a state of the power supplied from the external power supply, thereby detecting the power failure. When the external power supply is the commercial AC power supply, the power failure detection circuit 62 may detect the power failure by a waveform of the AC current supplied from the external power supply, and then may output the power failure notification signal.

As described above, the system control device 5 includes the main controller 51, the non-volatile memory 52, and the storage device 53. In the first configuration example, the main controller 51 includes a processor 511, a first power supply circuit 512, and a second power supply circuit 513. The main controller 51 may include a memory such as the RAM or various internal interfaces in addition to the configuration illustrated in FIG. 2.

The processor 511 controls the entire system control device 5. The processor 511 is, for example, a CPU. The processor 511 executes various kinds of control and computation processing by executing a program. The processor 511 is connected to the non-volatile memory 52 and the storage device 53 via a control bus. The processor 511 controls an operation of each device connected to the inside of the system control device 5 and the system control device 5 by outputting an operation command (a control signal) to one or more components of the MFP 1. For example, the processor 511 performs access such as data writing, data reading, and the like with respect to the non-volatile memory 52 and the storage device 53 to be connected via the control bus.

The first power supply circuit 512 is a circuit for supplying power to one or more components of the MFP 1 other than the storage device 53 in the system control device 5. The first power supply circuit 512 supplies the power supplied from the power supply controller 6 to one or more components of the MFP 1 other than the storage device 53 in the system control device 5. Further, the first power supply circuit 512 may include a plurality of power supply circuits.

The second power supply circuit 513 is a power supply circuit for the storage device 53. The second power supply circuit 513 supplies the power supplied from the power supply controller 6 to the storage device 53.

Further, the processor 511 is connected to the first power supply circuit 512 in the main controller 51. The processor 511 is connected to the power failure detection circuit 62 of the power supply controller 6. In the first configuration example illustrated in FIG. 2, when the power failure of the external power supply occurs (when the power supply to the power supply controller 6 is cut off), the processor 511 receives the power failure notification signal from the power failure detection circuit 62 of the power supply controller 6. When receiving the power failure notification signal, the processor 511 instructs an access stop to the non-volatile memory 52 and the storage device 53, and then outputs an output stop signal to the first power supply circuit 512. Thus, the first power supply circuit 512 stops the output of power to one or more components of the MFP 1 in response to the output stop signal from the processor 511. However, when receiving the power failure notification signal, the processor 511 does not output the output stop signal to the second power supply circuit 513. That is, when receiving the power failure notification signal, the processor 511 stops the power supply from the first power supply circuit 512 and continues to perform the power supply from the second power supply circuit 513 to the storage device 53.

The printer 3 includes the printer controller 31 that controls the components of drive device 32. The printer controller 31 includes a processor 311 and a power supply circuit 312 in the first configuration example.

The processor 311 controls the entire printer 3. The processor 311 is, for example, a CPU. The processor 311 executes various kinds of control and computation processing by executing a program. The processor 311 is connected to each drive device 32 as the printer drive system via a control bus. The processor 311 controls an operation of each drive device 32 by outputting an operation command (a control signal) to each drive device 32.

The power supply circuit 312 is a first power supply circuit that supplies power to each drive device 32 and one more components of the printer controller 31. For example, the power supply circuit 312 supplies driving power for operating a drive mechanism such as a motor, or the like, to a drive circuit of the drive device 32. Further, the power supply circuit 312 is connected to the processor 311 in the printer controller 31 and supplies operation power to the processor 311. The drive device 32 is operated by using the driving power from the power supply circuit 32 according to the control of the processor 311.

Further, the processor 311 is connected to the power failure detection circuit 62 of the power supply controller 6. In the first configuration example illustrated in FIG. 2, when the power failure of the external power supply occurs (when the power supply to the power supply controller 6 is cut off), the processor 311 receives a power failure notification signal from the power failure detection circuit 62 of the power supply controller 6. In the first configuration example, when receiving the power failure notification signal, the processor 311 outputs an output stop signal to the power supply circuit 312. The power supply circuit 312 stops the output of power to one or more components of the MFP 1 in response to the output stop signal from the processor 311.

Further, in the same manner as that of the printer 3, in the scanner 2, the scanner controller 21 includes a processor and a power supply circuit. Further, also in the operation panel 4, in the same manner as that of the printer 3, the panel controller 41 includes a processor and a power supply circuit. In the same manner as that of the printer 3, the scanner 2 and the operation panel 4 have a configuration in which the power supply circuit stops the output of power to one or more components of the MFP 1 in response to the power failure notification signal from the power supply controller 6.

Next, an operation when the power failure occurs in the MFP 1 according to the first configuration example will be described.

Figure 3:
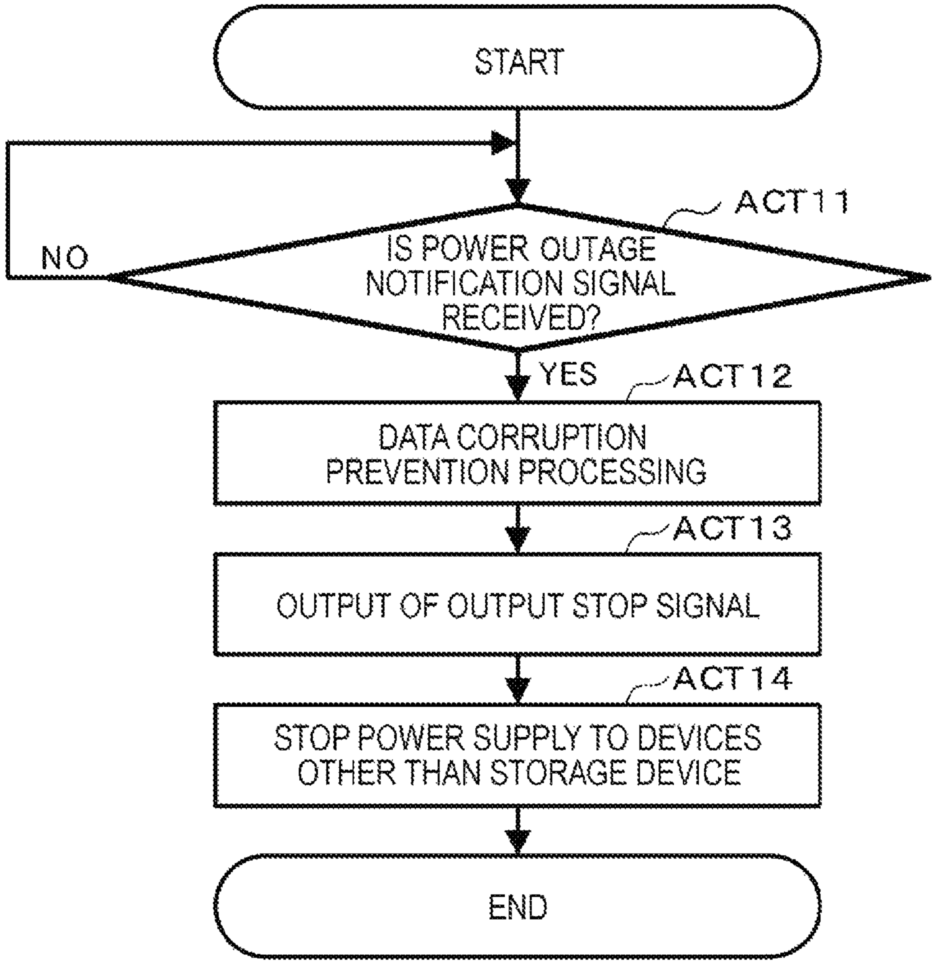
FIG. 3 is a flowchart of an operation of the power supply system in the first configuration example.

FIG. 3 illustrates the operation when the power failure occurs in the MFP 1 according to the first configuration example.

The main power supply circuit 61 of the power supply controller 6 temporarily stores power input from the external power supply, converts the power input therefrom into driving power, and outputs the driving power to the power supply circuit of one or more components of the MFP 1 (e.g., the scanner 2, the printer 3, the operation panel 4, and the system control device 5). Further, the power failure detection circuit 62 of the power supply controller 6 monitors the power input from the external power supply to the main power supply circuit 61. When the input of the power from the external power supply is stopped, the power failure detection circuit 62 outputs a power failure notification signal. The power failure detection circuit 62 supplies the power failure notification signal to the processors of the controllers of each component such as the processor 511 of the main controller 51 and the like.

When receiving the power failure notification signal (ACT 11, YES), the processor 511 of the main controller 51 executes data corruption prevention processing (ACT 12). The processor 511 performs an access stop to the non-volatile memory 52 and the storage device 53 as the data corruption prevention processing. Further, the processor 511 outputs an output stop signal to the first power supply circuit 512 as the data corruption prevention processing (ACT 13). Accordingly, the first power supply circuit 512 receives the output stop signal from the processor 511 and stops the supply of power to one or more components of the MFP 1 other than the storage device 53 (ACT 14). In this case, since the second power supply circuit 513 does not receive the output stop signal, the second power supply circuit 513 continues to supply the power to the storage device 53 as long as the power is supplied from the main power supply circuit 61.

Further, in the printer 3, the processor 311 of the printer controller 31 outputs an output stop signal to the power supply circuit 312 in response to the power failure notification signal from the power failure detection circuit 62. Accordingly, the power supply circuit 312 stops the supply of power to each drive device 32 as a device other than the storage device 53. In the same manner as that of the printer 3, the scanner 2 stops the supply of power to each drive device 22 as a device other than the storage device 53 in response to the power failure notification signal from the power failure detection circuit 62. In the same manner, the operation panel 4 stops the supply of power to devices (the display device 42 and the input device 43) other than the storage device 53 in response to the power failure notification signal from the power failure detection circuit 62.

As described above, the MFP 1 includes a storage device including a large capacity cache memory. The MFP 1 according to the first configuration example includes a power supply circuit for supplying the power to devices other than the storage device and a power supply circuit for the storage device for supplying the power to the storage device. When a power failure occurs, the processor supplies the output stop signal instructing to stop the output of power to each power supply circuit other than the power supply circuit for the storage device.

Accordingly, when the power failure occurs, the MFP 1 according to the first configuration example can stop the power supply to one or more components of the MFP 1 unit other than the storage device including the large capacity cache memory. That is, when the power failure occurs, residual power stored in the power supply controller can be preferentially supplied to the storage device, such that the power holding time to the storage device can be extended. As a result, the MFP 1 can secure a sufficient cache flush time for the storage device after a power failure.

Next, the second configuration example of the power supply system in the MFP 1 will be described.

Figure 4:
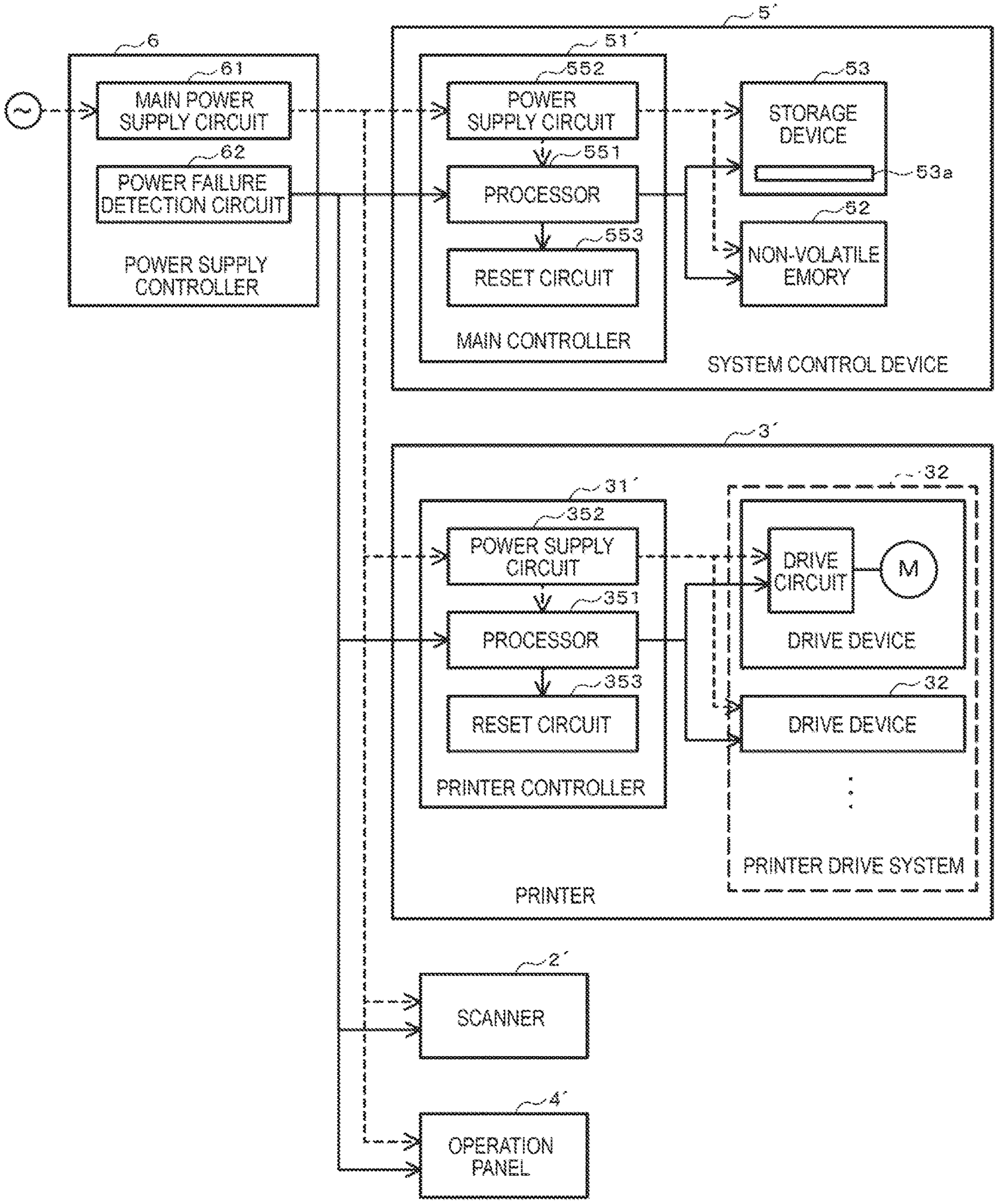
FIG. 4 is a block diagram illustrating a second configuration example of the power supply system.

FIG. 4 is a block diagram illustrating the second configuration example of the power supply system in the MFP 1.

In the same manner as that of the first configuration example illustrated in FIG. 2, the power supply controller 6 includes the main power supply circuit 61 and the power failure detection circuit 62.

In the same manner as that of the configurations illustrated in FIGS. 1 and 2, a system control device 5' includes a main controller 51', the non-volatile memory 52, and the storage device 53 including the cache memory 53*a*. In the second configuration example, the main controller 51' includes a processor 551, a power supply circuit 552, and a reset circuit 553. Further, the main controller 51' may include a memory such as a RAM, and the like or various internal interfaces in addition to the configuration illustrated in FIG. 4.

The processor 551 controls the entire system control device 5'. The processor 551 is, for example, a CPU. The processor 551 executes various kinds of control and computation processing by executing a program. The processor 551 is connected to the non-volatile memory 52 and the storage device 53 via a control bus. The processor 551 controls an operation of each device connected to the inside of the system control device 5' and the system control device 5' by outputting an operation command (a control signal) to each one or more components of the system control device 5'. For example, the processor 551 performs access such as data writing and data reading with respect to the non-volatile memory 52 and the storage device 53 to be connected via the control bus.

The power supply circuit 552 is a circuit for supplying power to one or more components of the system control device 5'. The power supply circuit 552 supplies the driving power supplied from the power supply controller 6 to one or more components of the system control device 5'. Further, the power supply circuit 552 may be formed of a plurality of power supply circuits.

The reset circuit 553 performs reset processing of forcibly resetting the entire system control device 5'. As the reset processing, the reset circuit 553 outputs a forced reset signal to one or more components of the main controller 51', and then puts the entire main controller 51' in an initial state. In a state where the main controller 51' is reset, the system control device 5' stops access to the non-volatile memory 52 and the storage device 53, and then stops the operation of the main controller 51'. However, even though the main controller 51' is reset, the power supply circuit 552 continues to supply the power from the power supply controller 6 to the storage device 53 as the driving power.

Further, the processor 551 is connected to the power failure detection circuit 62 of the power supply controller 6. In the second configuration example illustrated in FIG. 4, when the power failure of the external power supply occurs (when the power supply to the power supply controller 6 is cut off), the processor 551 receives a power failure notification signal from the power failure detection circuit 62 of the power supply controller 6. When receiving the power failure notification signal, the processor 551 instructs the reset circuit 553 to perform forced reset.

The reset circuit 553 puts the main controller 51' in reset state in response to the instruction of the forced reset from the processor 551. Accordingly, the system control device 5' stops access to the non-volatile memory 52 and the storage device 53, thereby stopping the operation of the main controller 51' while continuing to perform the power supply to the storage device 53.

Further, a printer controller 31' of a printer 3' includes a processor 351, a power supply circuit 352, and a reset circuit 353 in the second configuration example.

The processor 351 controls the entire printer 3'. The processor 351 is, for example, a CPU. The processor 351 executes various kinds of control and computation processing by executing a program. The processor 351 is connected to each drive device 32 as a printer drive system via a control bus. The processor 351 controls an operation of each drive device 32 by outputting an operation command (a control signal) to each drive device 32.

The power supply circuit 352 is a circuit that supplies power to each drive device 32 and one or more components of the printer controller 31'. The power supply circuit 352 supplies the driving power supplied from the power supply controller 6 to each component of the printer 3'.

The reset circuit 353 forcibly resets the entire printer 3'. The reset circuit 353 executes reset processing of putting the entire printer controller 31' into a reset state (an initial state) in response to a forced reset signal from the processor 351. In a state where the printer controller 31' is reset, the printer 3' stops the operation of each drive device 32.

Further, the processor 351 is connected to the power failure detection circuit 62 of the power supply controller 6. In the second configuration example illustrated in FIG. 4, when the power failure of the external power supply occurs (when the power supply to the power supply controller 6 is cut off), the processor 351 receives a power failure notification signal from the power failure detection circuit 62 of the power supply controller 6. When receiving the power failure notification signal, the processor 351 instructs the reset circuit 353 to perform forced reset. The reset circuit 353 forcibly executes the reset processing in response to the instruction of the forced reset from the processor 351.

Further, in the same manner as that of the printer 3', in a scanner 2', the scanner controller 21 includes a processor, a power supply circuit, and a reset circuit. Further, in the same manner as that of the printer 3', in an operation panel 4', the panel controller 41 includes a processor, a power supply circuit, and a reset circuit. The scanner 2' and the operation panel 4' forcibly execute reset processing by outputting, by the processor, a forced reset signal to the reset circuit in response to a power failure notification signal. Accordingly, also in the scanner 2' and the operation panel 4', the operation of one or more components of the scanner 2' and the operation panel 4' is stopped when the power failure occurs.

Next, an operation when the power failure occurs in the MFP 1 according to the second configuration example will be described.

Figure 5:
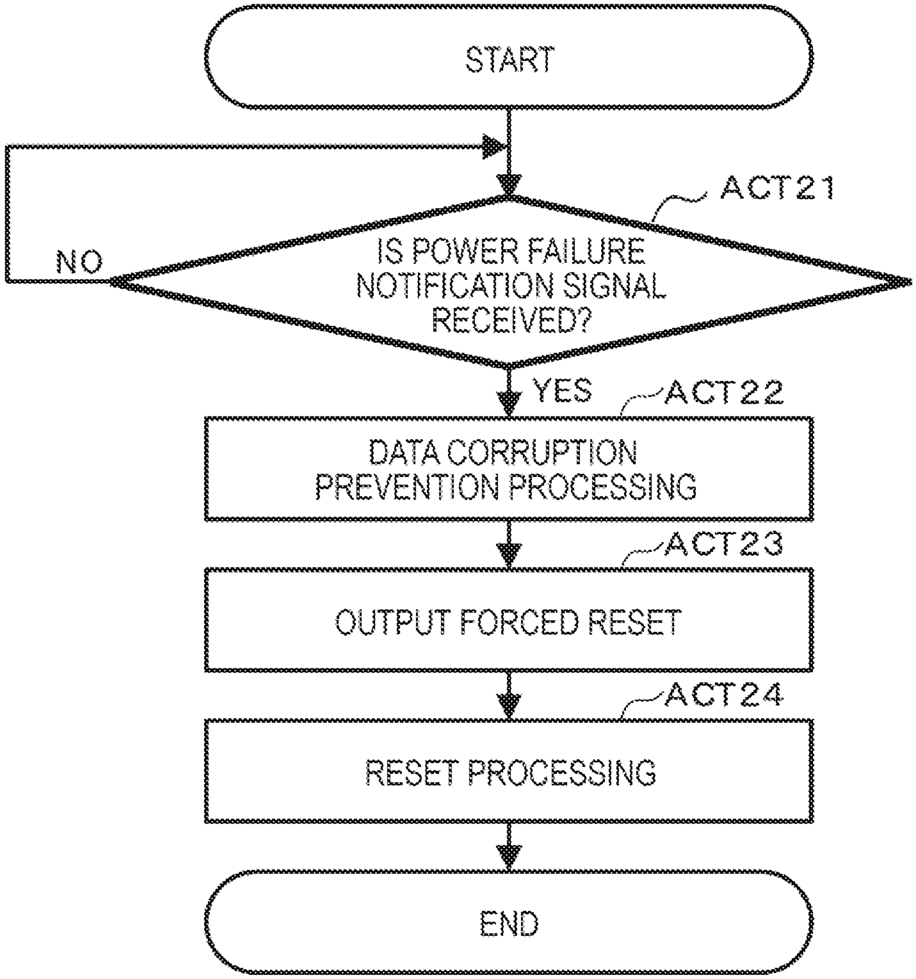
FIG. 5 is a flowchart an operation of the power supply system in the second configuration example.

FIG. 5 illustrates the operation when the power failure occurs in the MFP 1 according to the second configuration example.

When receiving a power failure notification signal from the power supply controller 6 (ACT 21, YES), the processor 551 of the system control device 5' executes data corruption prevention processing (ACT 22). The processor 551 performs an access stop to the non-volatile memory 52 and the storage device 53 as the data corruption prevention processing. Further, the processor 551 requests the reset circuit 553 to perform forced reset immediately after the data corruption prevention processing is performed (ACT 23). The reset circuit 553 forcibly executes reset processing in response to the request from the processor 551 (ACT 24). In a reset state, the storage device 53 continues to perform a cache flush operation. That is, even after the power failure occurs, the power supply circuit 552 continues to supply power to the storage device 53 as long as the power is supplied from the main power supply circuit 61. Accordingly, the storage device 53 continues to perform the cache flush operation using the power supplied from the power supply circuit 552.

Further, in the printer 3', the processor 351 of the printer controller 31' requests the reset circuit 353 to perform the forced reset in response to the power failure notification signal from the power failure detection circuit 62. The reset circuit 353 forcibly executes reset processing in response to the request from the processor 351. Each drive device 32 forcibly stops the operation thereof by the reset processing. Further, in the same manner as that of the printer 3', the scanner 2' is forcibly reset in response to the power failure notification signal, and each drive device 22 forcibly stops the operation thereof. Further, the operation panel 4' is also forcibly reset in response to the power failure notification signal, and devices such as the display device 42, the input device 43, and the like stop the operation thereof.

In the second configuration example, the MFP 1 also includes a storage device including a large capacity cache memory. In the MFP 1 according to the second configuration example, each controller forcibly stops the operation of devices by a forced reset in response to the power failure notification signal. Further, in the reset state, the power supply circuit 352 continues to supply power to the storage device 53. The storage device 53 continues to perform the cache flush operation using the power supply from the power supply circuit 352 even after the power failure occurs.

Accordingly, the MFP 1 according to the second configuration example can forcibly execute the reset processing immediately after the data corruption prevention processing has been performed when the power failure occurs. As a result, the operations other than the cache flush operation in the storage device can be forcibly stopped immediately after a power failure occurs, thereby making it possible to reduce a power load and to secure the cache flush time.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a printer;

a controller configured to transmit a control signal to the printer to control the printer;

a storage device including a volatile cache memory region and a non-volatile storage region; and a power control circuit configured to supply power from an external power source, which is external to the image forming apparatus, to the printer and the controller and supply stored auxiliary power when the power from the external power source is cut off, wherein the controller includes a processor configured to instruct the storage device to transfer data from the volatile cache memory region to the non-volatile storage region if the power from the external power source is cut off, and then cause power supplied to the processor to be cut off.

2. The image forming apparatus according to claim 1, wherein the controller also includes:

a first power supply circuit connected to the power control circuit and configured to supply power from the power control circuit to the processor; and a second power supply circuit connected to the power control circuit and configured to supply power from the power control circuit and configured to supply power from the power control circuit to the storage device, wherein the processor is configured to, in the case that the power from the external power source is cut off, control the first power supply circuit to cut off power supply to the processor and control the second power supply circuit to maintain power supply to the storage device.

3. The image forming apparatus according to claim 2, wherein the processor is configured to, in the case that the power from the external power source is cut off, stop writing of data into and reading of data out of the storage device.

4. The image forming apparatus according to claim 1, further comprising:

a power failure detection circuit configured to output a power failure notification signal to the processor when the power from the external power source is cut off, wherein when the processor receives the power failure notification signal, the processor controls the storage device to transfer data from the volatile cache memory region to the non-volatile storage region, and then causes the auxiliary power to be supplied to the storage device and power supply to the processor to be cut off.

5. The image forming apparatus according to claim 4, wherein the power failure detection circuit is integrated in the power control circuit.

6. The image forming apparatus according to claim 1, further comprising:

a non-volatile storage device, wherein the processor is further configured to, in the case that the power from the external power source is cut off, stop writing data into and reading data out of the non-volatile storage device.

7. The image forming apparatus according to claim 1, wherein the printer includes:

a printer drive device; and a printer processor configured to, in the case that the power from the external power source is cut off, cause power supply to the printer drive device to be cut off.

8. The image forming apparatus according to claim 1, further comprising:

a reset circuit configured to cause the controller to be in a reset state in which operation of the processor is disabled if the power from the external power source is cut off.

9. The image forming apparatus according to claim 8, wherein supply of the auxiliary power to the storage device is enabled when the controller is in the reset state.

10. The image forming apparatus according to claim 8, wherein the reset circuit is integrated in the controller.

11. A method for controlling an image forming apparatus including a printer, a controller including a processor, and a storage device including a volatile cache memory region and a non-volatile storage region, the method comprising:

supplying power from an external power source, which is external to the image forming apparatus, to the printer and the controller with a power control circuit; and when the power from the external power source is cut off, supplying stored auxiliary power in the image forming apparatus from the power control circuit to the controller; and instructing the storage device to transfer data from the volatile cache memory region to the non-volatile storage region, and then stopping the supply of stored auxiliary power to the processor while supplying stored auxiliary power to the storage device.

12. The method according to claim 11, wherein the controller includes:

a first power supply circuit connected to the power control circuit and configured to supply power from the power control circuit to the processor; and a second power supply circuit connected to the power control circuit and configured to supply power from the power control circuit and configured to supply power from the power control circuit to the storage device, and said stopping the supply of stored auxiliary power to the processor while supplying stored auxiliary power to the storage device comprises:

controlling the first power supply circuit to cut off the power supplied to the processor; and controlling the second power supply circuit to maintain the power supplied to the storage device.

13. The method according to claim 12, further comprising:

when the power from the external power source is cut off, terminating writing data into and reading data out of the storage device.

14. The method according to claim 11, further comprising:

when the power from the external power source is cut off, outputting a power failure notification signal from a power failure detection circuit to the processor.

15. The method according to claim 14, wherein the power failure detection circuit is integrated in the power control circuit.

16. The method according to claim 11, wherein the image forming apparatus further includes a non-volatile storage device, the method further comprising:

when the power from the external power source is cut off, stopping writing data into and reading data out of the non-volatile storage device.

17. The method according to claim 11, wherein the printer includes a printer drive device, the method further comprising:

when the power from the external power source is cut off, causing power supplied to the printer drive device to be cut off.

18. The method according to claim 11, wherein the image forming apparatus further includes a reset circuit, the method further comprising:

when the power from the external power source is cut off, outputting a reset signal from the reset circuit to cause the controller to be in a reset state in which operation of the processor is disabled.

19. The method according to claim 18, wherein supply of the auxiliary power to the storage device is enabled when the controller is in the reset state.

20. The method according to claim 18, wherein the reset circuit is integrated in the controller.

* * * * *